United States Patent
Zishiri

(10) Patent No.: US 10,906,844 B2
(45) Date of Patent: Feb. 2, 2021

(54) COMPOSTING APPARATUS AND PROCESS OF USE THEREOF

(71) Applicant: ANACONDA SYSTEMS LIMITED, Vancouver (CA)

(72) Inventor: Russell Zishiri, Vancouver (CA)

(73) Assignee: ANACONDA SYSTEMS LIMITED, Vancouver (CA)

( * ) Notice: Subject to any disclaimer, the term of this patent is extended or adjusted under 35 U.S.C. 154(b) by 0 days.

(21) Appl. No.: 16/071,062

(22) PCT Filed: Jan. 18, 2017

(86) PCT No.: PCT/CA2017/000012
§ 371 (c)(1),
(2) Date: Jul. 18, 2018

(87) PCT Pub. No.: WO2017/124178
PCT Pub. Date: Jul. 27, 2017

(65) Prior Publication Data
US 2020/0048155 A1    Feb. 13, 2020

Related U.S. Application Data

(60) Provisional application No. 62/280,112, filed on Jan. 18, 2016.

(51) Int. Cl.
*C05F 9/02* (2006.01)
*C05F 17/70* (2020.01)
(Continued)

(52) U.S. Cl.
CPC ............... *C05F 9/02* (2013.01); *C05F 17/10* (2020.01); *C05F 17/70* (2020.01); *C05F 17/914* (2020.01);
(Continued)

(58) Field of Classification Search
CPC .............. C05F 17/0223; C05F 17/0205; C05F 17/0072; C05F 17/02; C05F 17/027; C05F 17/0247; C05F 17/0229; B09B 3/00
(Continued)

(56) References Cited

U.S. PATENT DOCUMENTS

2002/0189084 A1* 12/2002 Downey ............... B09B 3/0025
29/791
2013/0260446 A1* 10/2013 Berberet ............... C05F 17/993
435/286.6
(Continued)

FOREIGN PATENT DOCUMENTS

DE    10253024 A1 *  6/2004  ............ C05F 17/986
DE    10253024 A1     6/2004

OTHER PUBLICATIONS

Machine Translation of DE10253024 A1 (Year: 2020).*
International Search Report for PCT/CA2017/000012 dated Jul. 27, 2017; 3 pages.

*Primary Examiner* — Michael L Hobbs
(74) *Attorney, Agent, or Firm* — Schwabe Williamson & Wyatt, PC

(57) ABSTRACT

Apparatus and method for converting organic waste into compost, having: a chamber, with an entry portal disposed near a top and one side of the chamber, and with an exit portal disposed at a bottom of the chamber; an auger extending at a level along a length of the chamber and adjacent to the top of the chamber; a collection chamber disposed under part of the chamber, aligning with the exit portal, and having a door for access therein; a bin fitting entirely within the collection chamber and removable therefrom; a blower for introducing controlled air; sensors to detect the level of organic waste in the chamber relative to the auger; a rotating gate between the exit portal and the collection chamber providing intermittent opening and clos- (Continued)

ing of the chamber to the bin therebelow; and a feedback circuit for delivering a switching signal from the sensors.

14 Claims, 13 Drawing Sheets

(51) Int. Cl.
    *C05F 17/10*     (2020.01)
    *C05F 17/971*     (2020.01)
    *C05F 17/993*     (2020.01)
    *C05F 17/943*     (2020.01)
    *C05F 17/914*     (2020.01)

(52) U.S. Cl.
    CPC .......... *C05F 17/943* (2020.01); *C05F 17/971* (2020.01); *C05F 17/993* (2020.01)

(58) Field of Classification Search
    USPC .......................................... 435/290.1–290.4
    See application file for complete search history.

(56) References Cited

U.S. PATENT DOCUMENTS

2015/0031123 A1*   1/2015   Delgado ............. B02C 18/2216
                                                                                                                    435/290.4
2017/0348741 A1*  12/2017   Iijima ........................ C10J 3/00

* cited by examiner

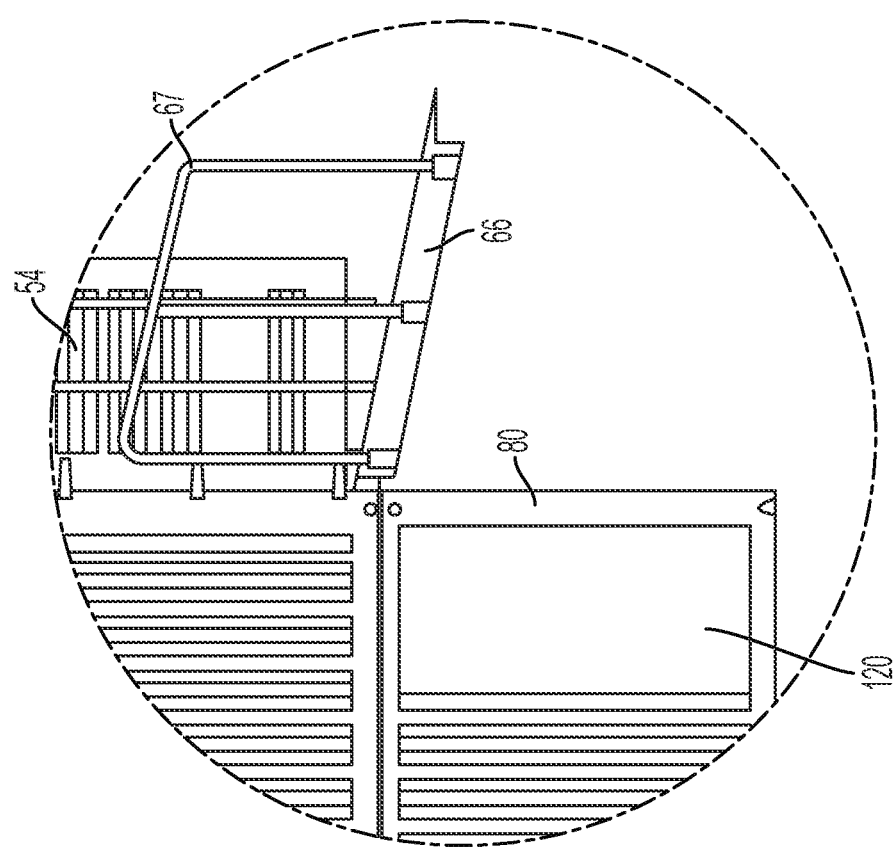

COMPOSTING APPARATUS AND PROCESS OF USE THEREOF

FIELD OF THE INVENTION

This invention relates to a method and apparatus for composting organic waste, and more specifically to a method and apparatus for recycling and/or converting waste organic products into usable compost on site.

BACKGROUND OF THE INVENTION

The growth of organic waste is an issue that must be addressed. In particular, the accumulation of waste products at various types of food establishments, e.g. grocery stores, supermarkets, large restaurants, wholesale fruit and vegetable packers, food distributors and the like, has evolved in a considerable waste disposal problem. Such waste consists primarily of spoiled fruits, and vegetables and sometimes the cartons in which such products are shipped.

Accumulations of such waste now must be separately carted in dumpsters to various landfills or other suitable disposable areas, e.g. incinerators or the like. As landfills are being phased out in many regions, and incineration constitutes a source of air pollution, the problem of the disposing of such waste material is ever-increasing and rendering it ever more expensive for such establishments to dispose of their waste material. In fact, there are new regulations in some jurisdictions which prohibit tipping of organics into landfills. Municipal and city governments are focusing efforts on green initiatives as citizens are demanding better solutions for addressing this ever-increasing growth of organic waste Currently, in many regions, organic haulers are travelling long distances and burning more fossil fuels to tip organic waste into rural organic processing facilities. To-date, no processing solution/system can operate in an urban setting while addressing health and safety requirements.

It is an object of the present invention to obviate or mitigate the above disadvantages.

SUMMARY OF THE INVENTION

This invention is directed to a method and apparatus for disposing of organic waste, for example, rotten or wasted fruits and vegetables and the cardboard containers in which such produce are shipped to various grocery outlets, supermarkets, restaurants and the like and to use such waste to produce useable compost.

The present invention provides, in one aspect, a self-contained apparatus for converting organic waste into compost which comprises:
  a) an enclosed composting chamber comprising a top, a bottom, a first end, a second end and two opposing sides, wherein the composting chamber comprises, adjacent to a corner between the top and one side, an organic matter entry portal and also comprises, at the bottom of the composting chamber, a compost exit portal;
  b) an auger extending at a level along a length of the composting chamber and adjacent to the top of the composting chamber;
  c) a sealable collection chamber disposed under at least a part of the composting chamber, aligning with the compost exit portal, said collection chamber comprising at, at least one end thereof, a door for access therein;
  d) a collection bin of a size and dimension to fit entirely with the collection chamber and removable therefrom when full of compost;
  e) an air supply means for introducing controlled air into the composting chamber to aid in the decomposition of the organic material;
  f) sensors to detect the level of organic material in the composting chamber relative to the level of the auger;
  g) a rotating gate between the compost exit portal and the collection chamber providing intermittent closing the of the composting chamber and opening of the compositing chamber for transference of compost from the composting chamber to the collection bin there below; and
  h) a means to deliver at least one switching signal from the sensor.

The present invention provides, in another aspect, a process of composting organic matter using the apparatus of the present invention, as described and claimed herein.

The present system and apparatus is simple but functions extremely well. It does not require a complicated means of trying to ensure even distribution of organic material within a composting chamber. This is readily achieved, at least in part, by the use and placement of an auger to re-distribute material laterally, the placement of a rotating gate to allow processed material to move vertically through the chamber and to enable continuous removal of composted material from the bin so an appropriate chamber "fullness" is achieved, for optimal processing and steady state composting and the feedback connection between the sensors and both the rotating gate and the auger in order to, intermittently i) turn the auger as connection between sensors is lost due to organic material fill level and ii) open rotating gate as connection between sensors is established and maintained over a pre-determined time.

The apparatus as provided herein offers significant advantages over previously known and used apparatuses for the above-noted reasons. Furthermore, the apparatus enables the composting of green waste from retail, wholesale food stores and thus reduces costs and environmental impacts of green waste haulage and disposal to landfill. The apparatus can be operated readily in an urban setting due to the odour of rodent control measures in the design. The apparatus is highly scalable and each system can be sized to fit the appropriate need and application. The apparatus produces a valuable compost with possible certification as a higher value fertilizer. The apparatus operates in a simple and efficient manner, without complex requirements to monitor temperature, pH and level of microbes, all of which would be a detriment to use in a small commercial setting, such as a grocery store.

These and other advantages will be full appreciated by the preferred description and figures provided below.

BRIEF DESCRIPTION OF THE DRAWINGS

FIG. 16 is a side view showing loading ramp;

Figure 1:
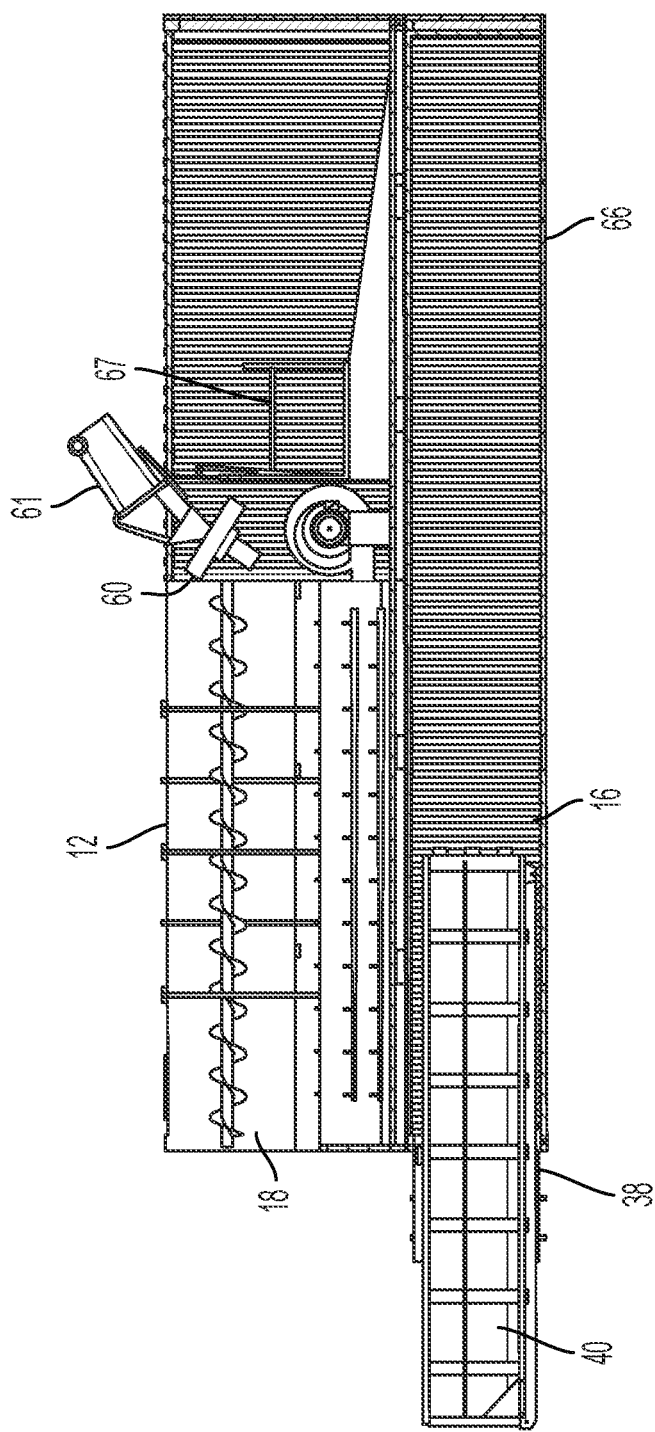
FIG. 1 is a side cross-sectional view of the system of the invention.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

I. Terms

The term "product" means any machine, manufacture and/or composition of matter, unless expressly specified otherwise.

The term "apparatus" means the organic matter processing system in accordance with the present invention.

The term "method" or "process" means any process, method or the like, of using the apparatus of the invention, unless expressly specified otherwise.

Each process (whether called a method or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an aspect", "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" or "variant" of an invention means an embodiment of the invention, unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in a sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

This description of preferred embodiments is to be read in connection with the accompanying drawings, which are part of the entire written description of this invention. In the description, corresponding reference numbers are used throughout to identify the same or functionally similar elements. Relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and are not intended to require a particular orientation unless specifically stated as such. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g. 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R..sctn.1.72(b). The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

II Overview

The invention comprises an apparatus and process and system essentially used for the production of compost from organic waste material. Micro-organisms, such as bacteria, mold fungi, protozoa, nematodes or actinomycetes participate in the composting process, and the aerobic decomposition produces a highly usable compost material.

Decomposition or rotting depends essentially on the oxygen content, water content, C/N nutrient content, temperature and pH of the material to be converted. With a sufficient air supply, this process proceeds virtually without odors, in particular, at temperatures of 60° to 90° on average.

The present invention preferably provides a self-contained apparatus for converting organic waste into compost which comprises: a) an enclosed composting chamber comprising a top, a bottom, a first end, a second end and two opposing sides, wherein the composting chamber comprises, adjacent to a corner between the top and one side, an organic matter entry portal and also comprises, at the bottom of the composting chamber, a compost exit portal; b) an auger extending along a length of the composting chamber and adjacent to the top of the composting chamber; c) a sealable collection chamber disposed under at least a part of the composting chamber, aligning with the compost exit portal, said collection chamber comprising at, at least one end thereof, a door for access therein; d) a collection bin of a size and dimension to fit entirely with the collection chamber and removable therefrom when full of compost; e) an air supply means for introducing controlled air into the composting chamber to aid in the decomposition of the organic material; f) sensors to detect the level of organic material in the composting chamber relative to a level of the auger; g) a rotating gate between the compost exit portal and the collection chamber providing intermittent closing the of the composting chamber and opening of the composting chamber for transference of compost from the composting chamber to the collection bin there below; and h) a feedback circuit linking the sensors to both the rotating gate and the auger.

Preferably, a shredder is disposed adjacent to the entry portal.

The present invention provides an apparatus in which optimal operation is best at or near full. Hence, a key aspect of the present invention is the interconnection between "fill level" sensors, the auger and the rotating gate, which is the exit gate for processed matter at the bottom of the composting container. Using the feedback data enabled by sensors, and (in a preferred aspect), a switch and a microprocessor, the level of the composting container can easily be maintained at an optimal fill level, relative to the auger, as explained further herein. There are no complex parts required to achieve turning and mixing. The horizontal auger simply moves the mass of organic material, fed from the organic matter entry port, along from the entry portal to the compost exit portal below and at the other end of the apparatus. Preferably, all new organic material is fed through a chipper prior to feeding into the container so that surface area of particulates is increased for drying.

The present invention provides a sealed apparatus which is aerated. Aeration accelerates drying. Bacteria used in composting process create heat which further accelerates drying under these closed, controlled conditions. One key operational aspect, which the design of the present apparatus achieves well, is the maintenance of aerobic conditions (balance of oxygen, heat and bacteria viability). Processed organic material, within the enclosed composting chamber, "sinks" below the auger. Newly in-fed organic material sits at the top (due to position of entry portal), above the more advanced processed material. The apparatus reduces volume of organic material under aerobic conditions (hence, no smell, a reduction in pests and animals, etc. . . . ).

Sensors

The sensor provided within the scope of the invention measures and monitors organic matter "fill" level relative to the auger. Primarily, when the maximum fill level is reached i.e. material is filled "above" the level of the auger, the sensor delivers one or more switching signals to i) stop the inflow of new organic material at the entry portal; ii) turn the auger for a selected time, which may be pre-programmed; thereby pulling material through the container, away from the entry portal; iii) open the rotating gate for a selected time period, which may be pre-programmed, for removal of composted content at the bottom of the container.

Preferably, sensor is in operative communication with a control and a microprocessor, which receives the fill level data and directs those one or more actions: i) stopping the inflow of new organic material at the entry portal; ii) turning the auger for a selected time, which may be pre-programmed; iii) opening the rotating gate for a selected time period, which may be pre-programmed, for removal of composted content at the bottom of the container. Alternatively, data from sensor can be acted upon manually, by a user, to do any one of those steps.

There are a variety of sensors which can achieve this result.

Fill level may be monitored by a laser sensor or ultrasonic sensor with output, in one aspect, as an analog value. When the maximum fill level is reached, the sensor delivers an additional switching signal to stop the flow of the material. More preferably, fill level is monitored by an opposed-mode sensor system (for example a photoelectric system) wherein emitter and receiver are separate and placed opposite each other, on opposite ends of the composting container but, importantly, adjacent to each end of the auger. When the fill level "breaks" the beam, this is indicative that fill or organic material has exceeded the level of the auger and that one or more action commands are in order: i) stopping ingress of new organic material at the entry portal and ii) turning the auger. Conversely, when the beam has not been "broken" for a pre-determined elapsed time (based in part upon the size of the container) this is indicative that fill or organic material is below the level of the auger and that at least one action or command is in order: opening the rotating gate to release processed compost at the bottom of the container. These commands and actions, based upon fill level relative to auger, are equally applicable to other sensor types (not just opposed-mode sensors).

As will be apparent from the description herein, sensing organic material fill level in the container (and responding to such fill level) relative to the level of the auger is important. No other apparatus has appreciated the efficient operational simplicity of this arrangement.

Turning now to the figures, wherein like numbers denote like parts throughout the several views, FIGS. 1-18 are illustrative views of an apparatus consistent with various embodiments of the invention.

Figure 2:
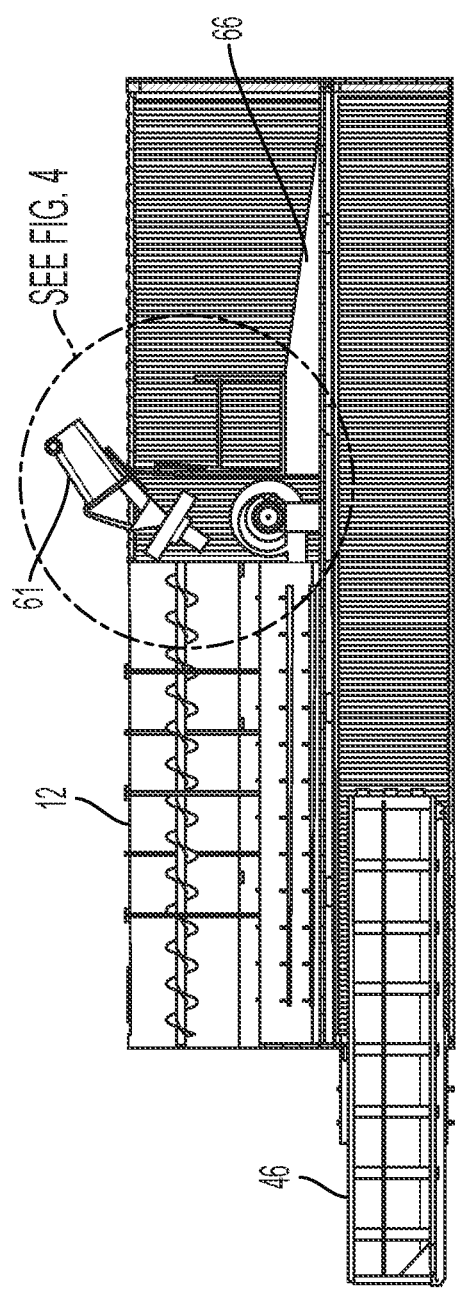
FIG. 2 is another side cross-sectional view of the system of the invention.
Figure 4:
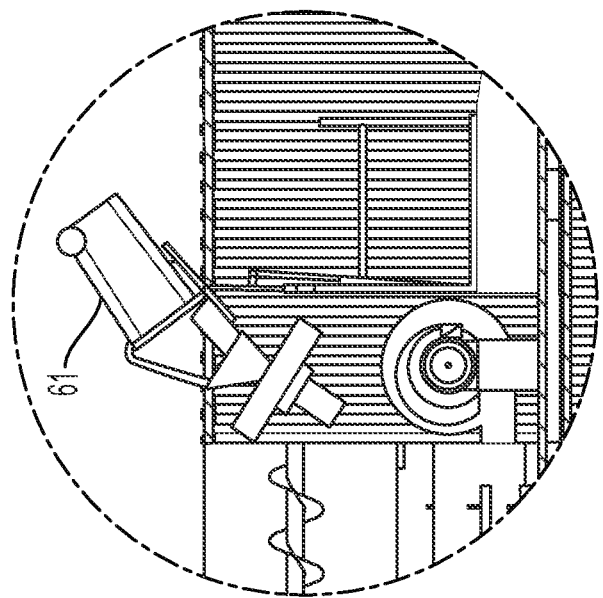
FIG. 4 is a further end view of the system of the invention
Figure 3:
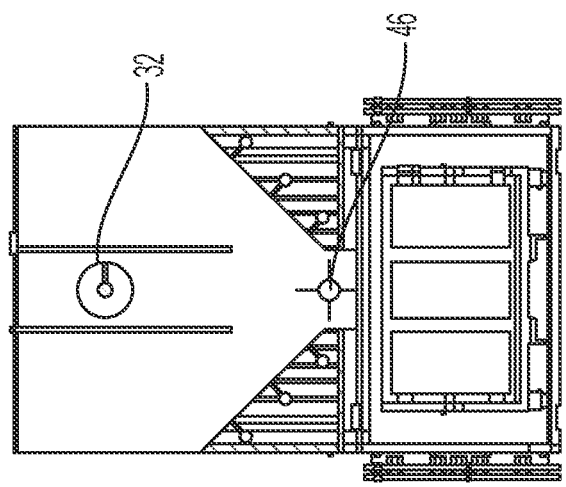
FIG. 3 is an end view of the system of the invention.
Figure 5:
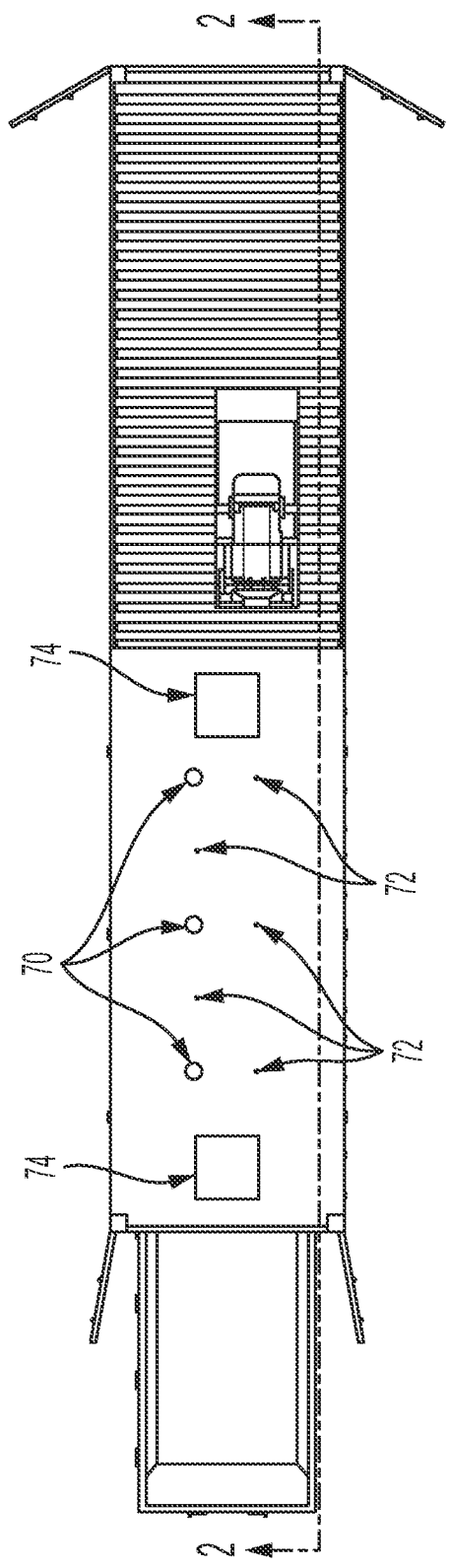
FIG. 5 is a top plan view of the system of the invention.
Figure 7:
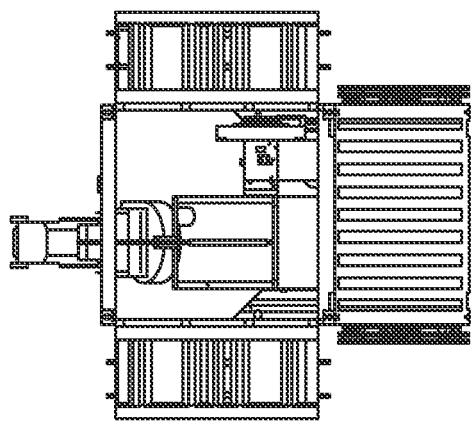
FIG. 7 is a further end view of the system of the invention.
Figure 6:
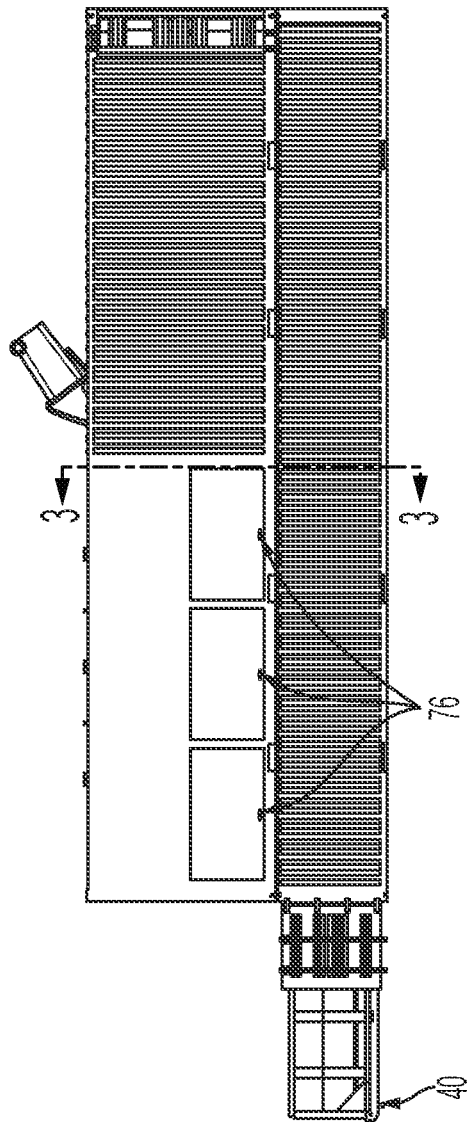
FIG. 6 is a further side view of the system of the invention.
Figure 8:
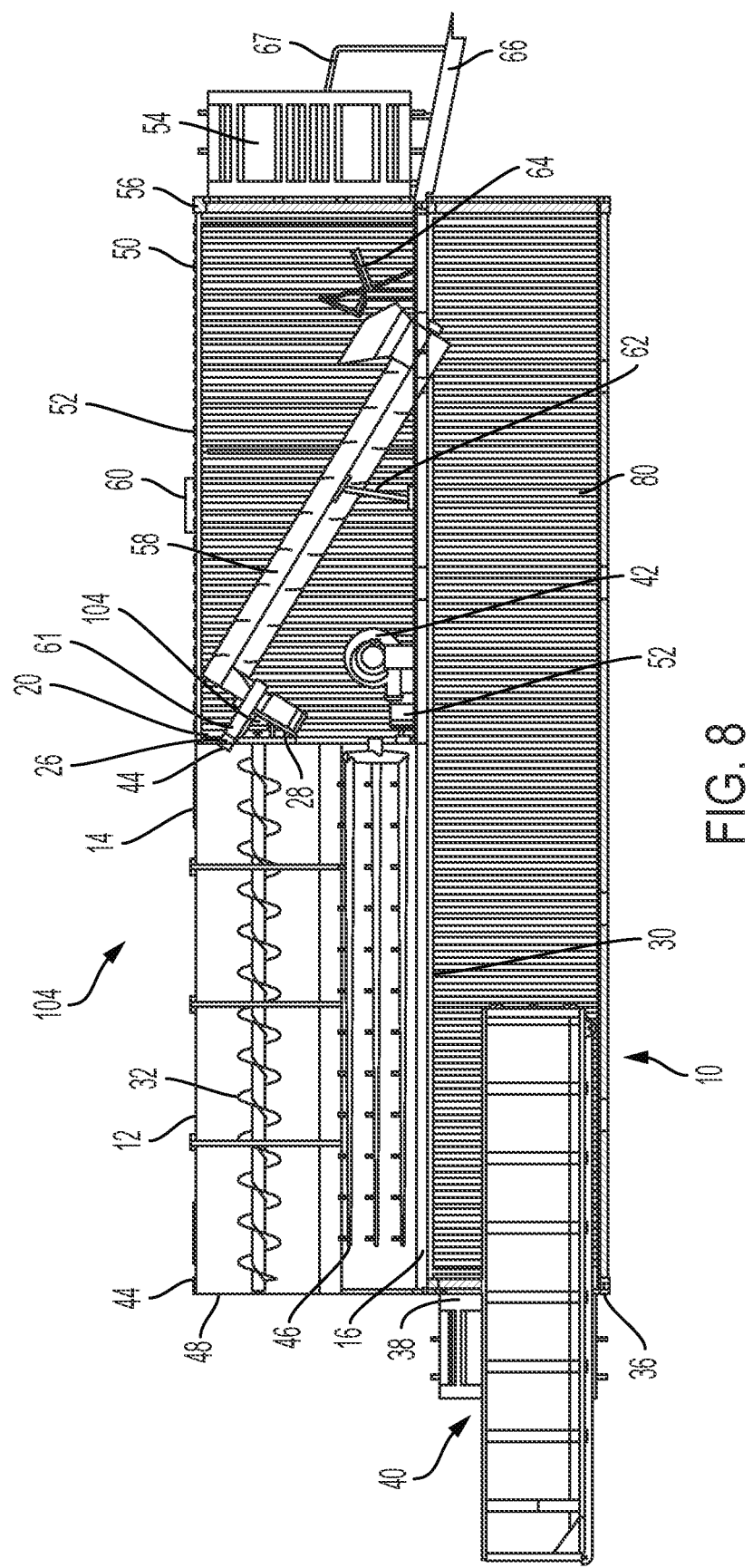
FIG. 8 is a more detailed side cross-sectional view of the system of the invention.
Figure 9:
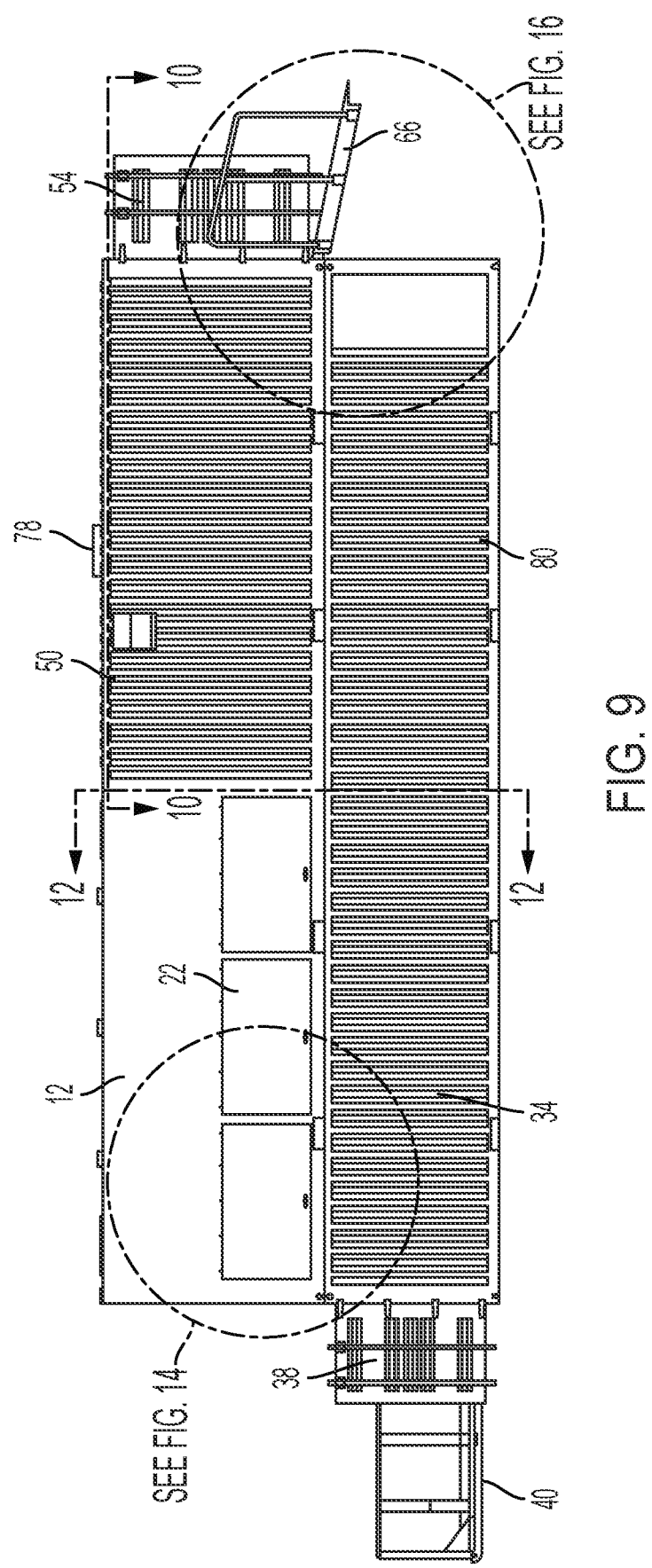
FIG. 9 is a further side view of the system of the invention.

As shown best in FIGS. 1, 2 and 8, a self-contained apparatus (generally at 10) for converting organic waste into compost comprises: a) an enclosed composting chamber 12 comprising a top 14, a bottom 16, a first end 18, a second end 20 and two opposing sides, 22 and 24 wherein the composting chamber comprises, adjacent to a corner 26 between the top 14 and one end 20, an organic matter entry portal 28 and also comprises, at the bottom 16 of the composting chamber 12, a compost exit portal 30; b) an auger 32 (powered by motor 104) extending along a length of the composting chamber 12 and adjacent to top 14 of the composting chamber 12; c) a sealable collection chamber 34 disposed under at least a part of composting chamber, aligning with the compost exit portal 30, said collection chamber 34 comprising at, at least one end 36 thereof, a door 38 for access therein; d) a collection bin 40 of a size and dimension to fit entirely with collection chamber 34 and removable therefrom when full of compost; e) an air supply means 42 for introducing controlled air into composting chamber 12 to aid in the decomposition of the organic material; f) sensor(s) 44 to detect the level of organic material in composting chamber 12 relative to a level of auger 32; g) a rotating gate 46 between compost exit portal 30 and collection chamber 34 providing intermittent closing the of composting chamber 12 and opening of compositing chamber 12 for transference of compost from composting chamber 12 to collection bin 40 there below; and h) a feedback means 48 linking sensor(s) 44 to both rotating gate 46 and the auger 32.

It is preferred that a chipper assembly (generally shown at 50 as described further below) is engageable with composting chamber 12. In one embodiment, chipper assembly 50 (and all components), composting chamber 12, collection chamber 34, all motors (for example gate motor 52), air supply means 42 (for example an air blower) are encased in one housing (self-contained apparatus 10) with all necessary access gates and portals for entry of organic material into chipper, for servicing of components and for removal and replacement of collection bin 40. Apparatus 10 may comprise a servicing chamber 80 adjacent to collection chamber 34.

Figure 10:
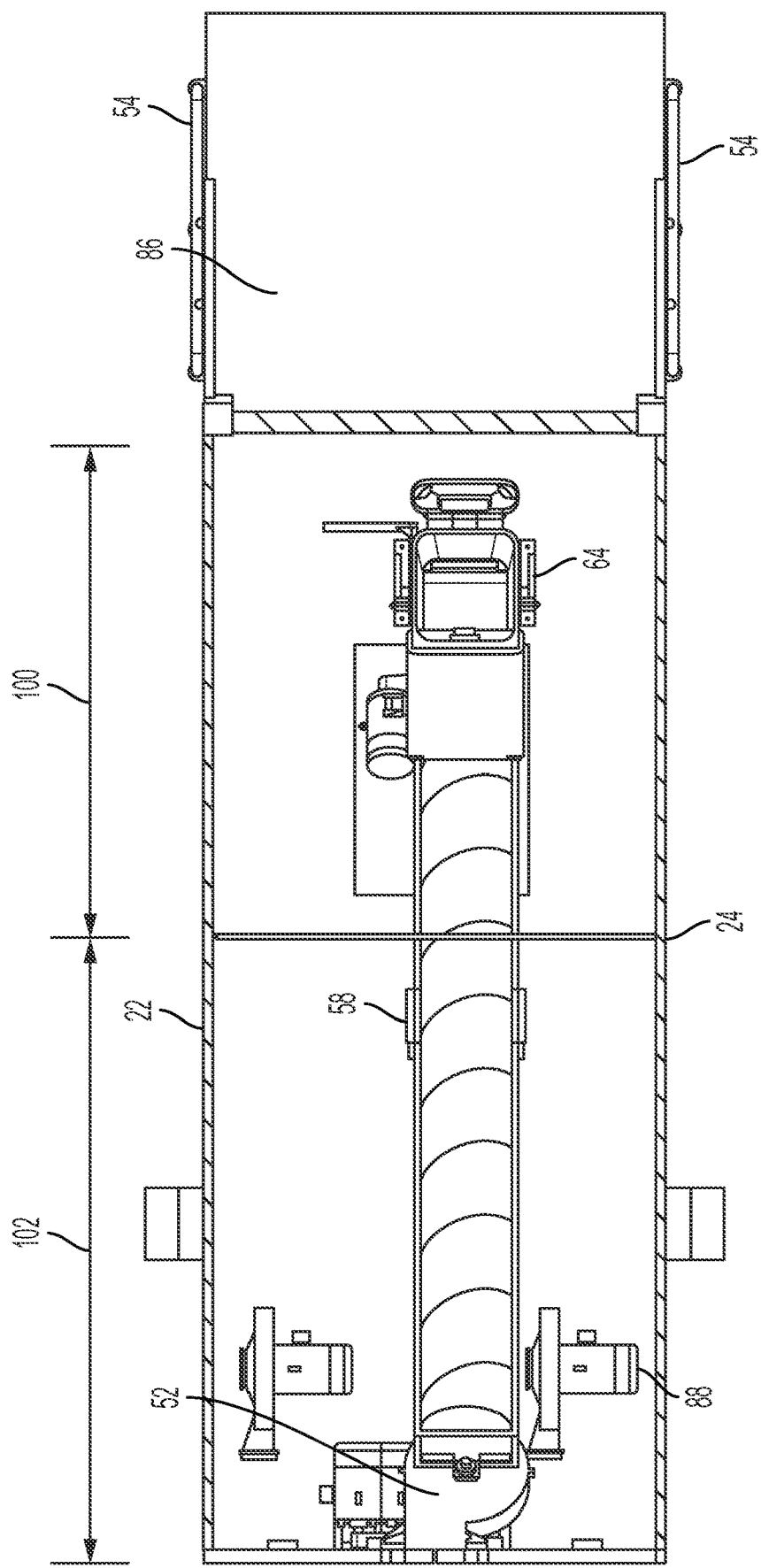
FIG. 10 a further side view of the system of the invention.

Chipper assembly 50 serves to accept delivery of the raw organic matter via a loading means, which may comprise a conveyer belt or auger, although there are a multitude of ways to achieve this. The raw organic matter is conveyed to a chipper which is preferably adjacent to organic matter entry portal 28 to reduce size of the matter prior to entry into the compositing chamber. As illustrated in the figures, chipper assembly 50 comprises enclosed chipper housing 52 with loading door 54 at one end 56 thereof (within loading bay 86), chipper auger 58, high pressure air blower 88, ventilation hatch 60, chipper auger mount 62, chipper 61, bin inverter assembly 64 and ramp 66. Ramp 66 may be retractable into chipper assembly 50 and may comprise safety handles 67. As shown in FIG. 10, chipper assembly may be delineated in two zones: feed room 100 and service room 102.

Figure 11:
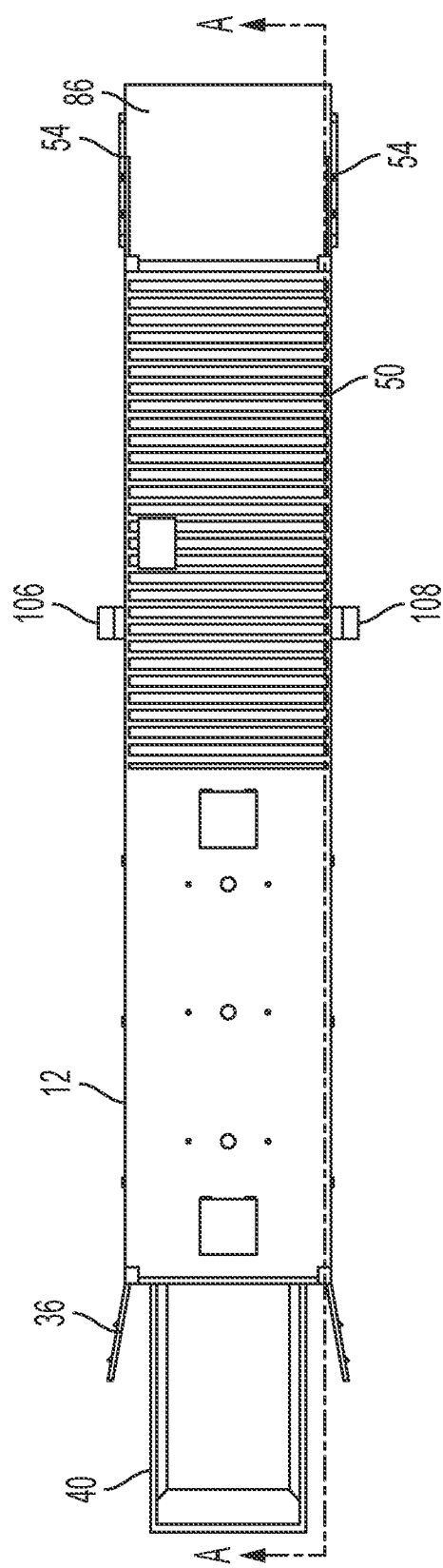
FIG. 11 is a further a top plan view of the system of the invention.

FIG. 11 best depicts the three "zones" of chipper assembly 50, composting container and collection bin removal from chamber.

wherein said chamber comprises an auger adjacent to the entry portal and wherein auger is operatively aligned with at least one sensor to measure the fill of the chamber, relative to a level of the auger;

b) measuring the fill of the chamber relative to the level of the auger and in response, i) stopping the inflow of shredded organic matter at the entry portal; ii) turning the auger for a selected time, which may be pre-programmed; iii) opening a rotating exit gate for a selected time period, which may be pre-programmed, for removal of composted content at the bottom of the chamber.

In one embodiment, in operation of the process (with reference to FIG. 1) is illustrated in Table 1:

TABLE 1

| | Processing Steps | |
|---|---|---|
| | Process | Description |
| 1 | Food waste delivered | Wheeled totes manually pushed onto hydraulic equipped ramp |
| 2 | Food waste enters for processing | Hydraulic lift opens hopper and tilts tote for delivery of weighed food waste |
| 3 | Food waste processed by chipper | Hopper feeds chipper knife blades with result projected into BloDryer |
| 4 | Food waste distributed by Auger | Top auger draws freshly chipped green waste down length of unit |
| 5 | Blower inject air | 2 Blowers inject air through the unit bed with venting out top of bin |
| 6 | Paddle Gate Controls Waste Delivery | Light sensor activated paddle gate rotates to control delivery to chipper |
| 7 | Chamber Doors open | Counter measures paddle rotations and opens chamber doors when % full |
| 8 | Full Collection Box Removed | Full sealed collection box is removed, hauled away, and replaced |

Apparatus 10 additionally comprises air vents 70, additional air lines 72, top service hatch 74, air lines service doors 76, ventilation hatches 78. Collection chamber 34 houses collection bin 40.

Figure 12:
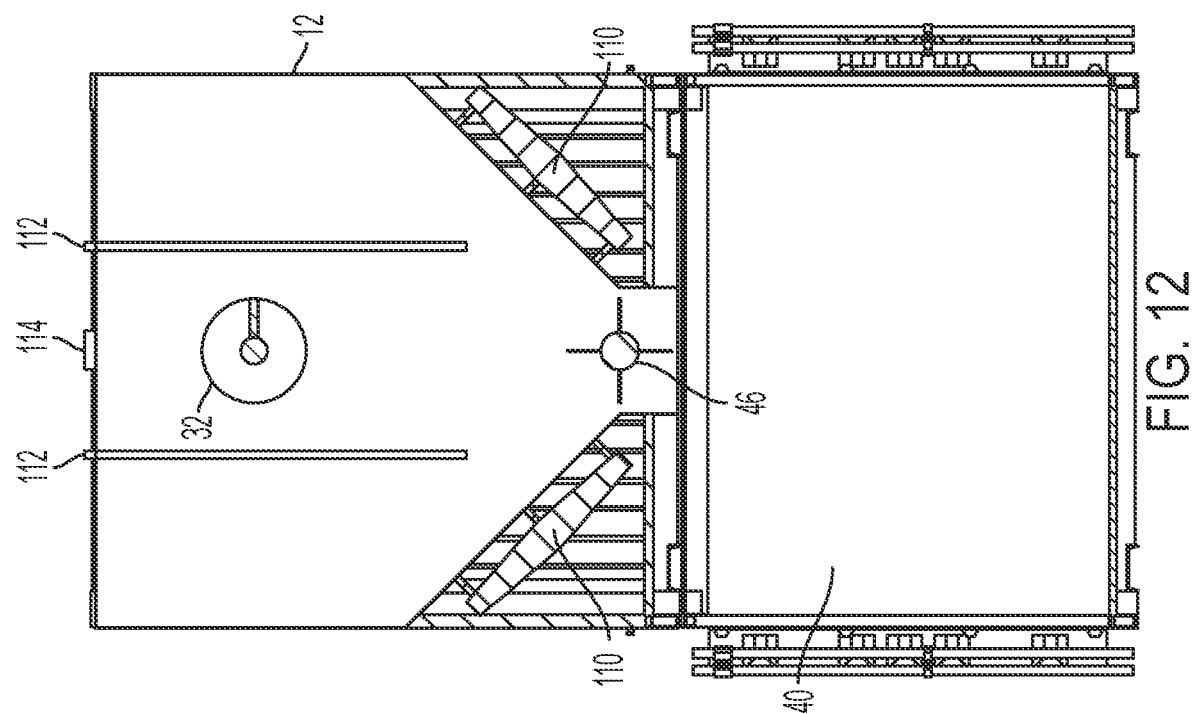
FIG. 12 is an end cross sectional view of the system of the invention.
Figure 13:
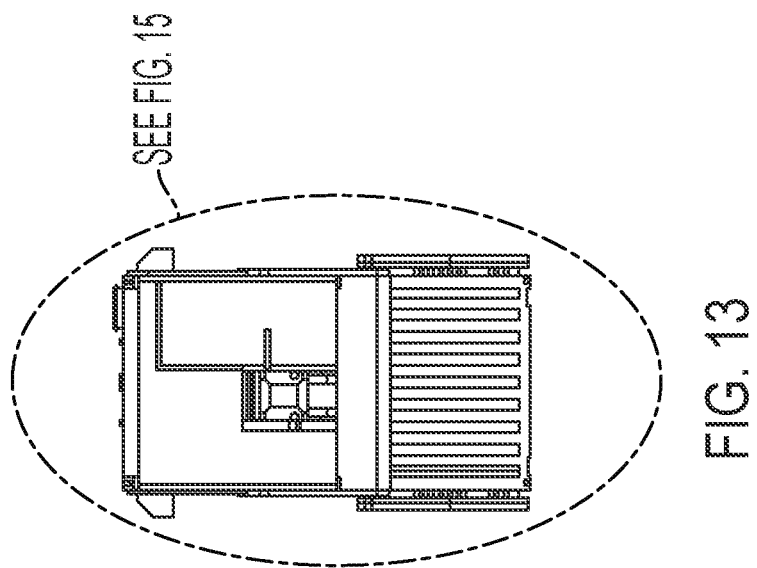
FIG. 13 is a further end view of the system of the invention.
Figure 14:
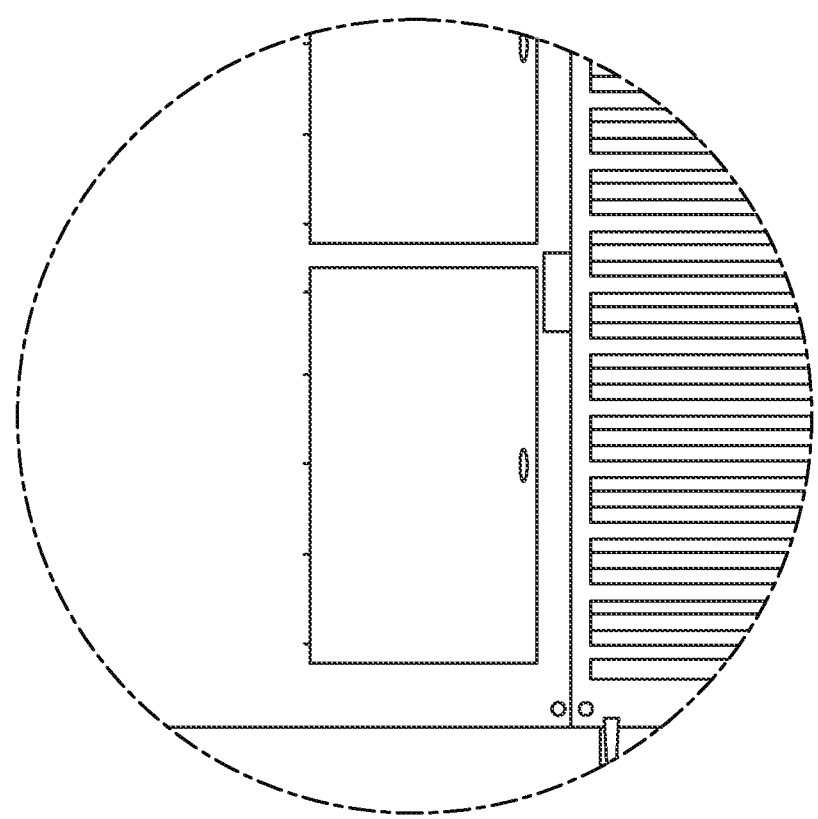
FIG. 14 is an end view of service door.
Figure 15:
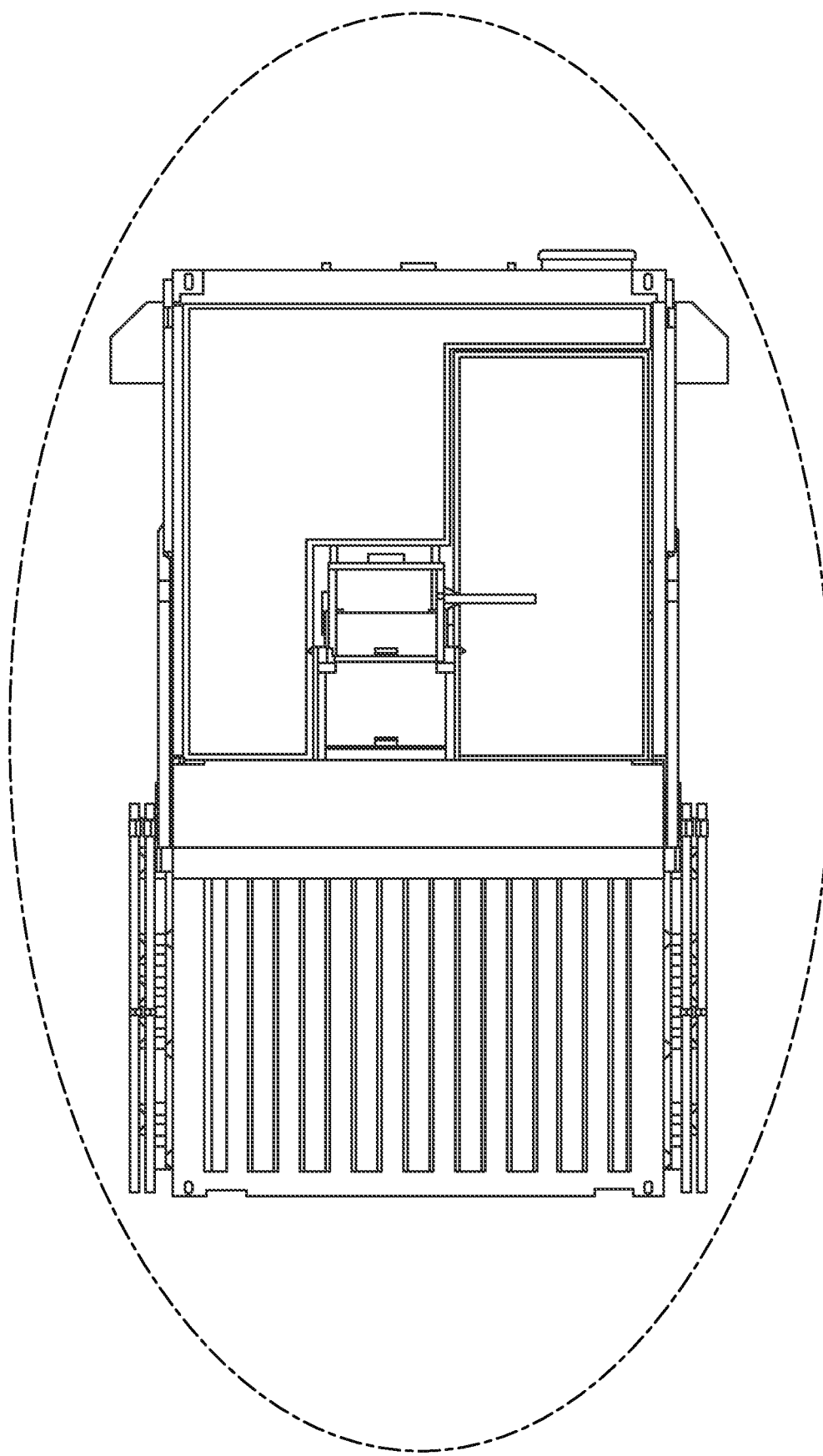
FIG. 15 is a side view of service door.

FIG. 12 best illustrates the preferred shape of composting container 12, with a V-shaped bottom surface 110. This shape aids in processing. Collection bin 40 disposed in collection chamber 34 engages with bottom surface via rotating gate 46. Air inlet lines 114 and air vents 114 are provided. FIG. 16 additionally exemplifies ramp 66 and shows service door 120.

Figure 17:
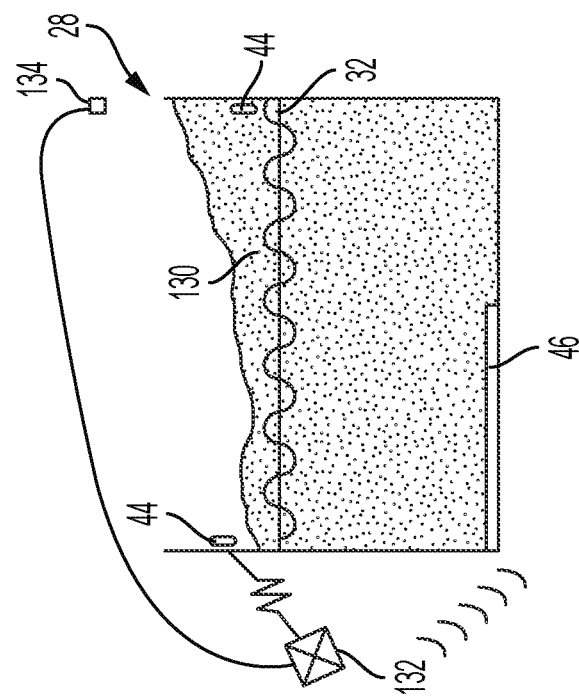
FIG. 17 shows a cut-away of sensors, relative to auger.

FIG. 17 illustrates opposed contact sensors 44, positioned just above auger 32. In this figure, organic material 130 exceeds level of auger and hence there would be break in contact between transmission and receipt of signal between sensors. Microprocessor 132, in operative communications with sensors 44 signals to gate 46, auger motor 104 and intake control 134 at portal 28. Microprocessor 132 could in this scenario signal gate 46 closing, no further raw material input at intake control 134 via portal 28 and auger turning.

Figure 18:
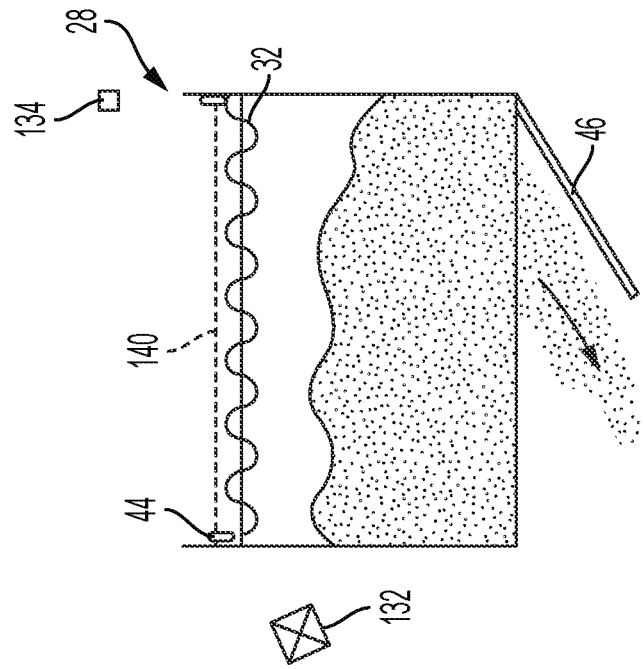
FIG. 18 is a further cut away of sensor measuring fill.

FIG. 18 illustrates opposed contact sensors 44, positioned just above auger 32. In this figure, organic material 130 is below level of auger and hence there would be no break in contact (140) between transmission and receipt of signal between sensors. Microprocessor 132 could in this scenario signal gate 46 opening and further raw material input at intake control 134 via portal 28.

The present invention provides a process of composting which comprises:
 a) introducing shredded raw organic matter into an enclosed composting chamber through an entry portal, One preferred aspect of the process of the invention is as follows:
1. Green food waste in wheeled totes are manually pushed onto a loading ramp equipped with a hydraulic lift. A weight scale measures the weight and records it in a data acquisition system. An operator pushes a button to start the lift, also starting the chipper and the top auger. It is to be understood that manual loading could be replaced with alternative automated systems, for example, a hopper and conveyor system. In this way t, trucks could tip waste into a hopper, and the waste transferred into the composting container via a conveyor or auger.
2. The hydraulic lift opens the lid to the hopper and tilts the wheeled tote to at least 135° and, over a period of time of up to about 2 minutes, empties the tote into the hopper. On a timed basis, the hydraulic lift closes the hopper lid and lowers the wheeled tote back onto the loading ramp where it is weighed and recorded and then manually removed so a new wheeled tote can be put in its place. Steps 1 and 2 are repeated as needed. The total weight of loaded green waste can be compared to the dried and composted green waste in the collection bin.
3. The hopper feeds a chipper that consists of knife blades mounted on a rapidly rotating disk. Green waste is chipped to nominal 1" (2.5 cm) particle size and is projected into the composting chamber by the chipper. (generally, projection distance does not matter.) The chipper and auger are shut off when the tote is returned to the base of the lift.

4. The apparatus is operated (preferably and optimally) at at least 90% full. In one aspect, a light sensor across the width of the composting chamber near the freshly chipped green (organic) waste detects when the composting chamber is full.
5. A top auger along the length of the composting chamber draws freshly chipped green organic waste down the length of the apparatus. The auger operates whenever the chipper is running. Preferably, the auger rotational speed is set so the area inside the composting chamber immediately adjacent to the chipper is kept clear of chipped green organic waste. The auger's function is to keep the incoming waste evenly distributed along the length of the composter as the chamber fills up. The auger will rotate whenever the sensors detect a predetermined fill level (for example, the top of the pile) so as to help waste move along the length of the chamber. This will be most important when the level of waste reaches or is close to the auger
6. In a preferred aspect, two blowers continuously inject air up through the bed of the composting chamber. Air is vented out of the top of the composting chamber. The maximum rate of air flow is limited by the availability of single phase electricity to power the blower, nominally 5 hp.
7. Activated by a light sensor, a rotary 4 paddle gate rotates in 90° increments (to minimize intrusion of rats into the composting chamber) until the light sensor at the top of the composting chamber detects that there is again room for more green waste adjacent to the chipper.
8. A counter on the rotary gate indicates the number of gate rotations and hence the amount of composted and dried green waste that should have dropped into the underlying 20'×6'×4' (18 m3 or 640 ft3) height roll-off collection bin, within the collection chamber. The counter may be calibrated to read "% Full" so a user knows when to replace the collection bin. In one aspect, a maximum weight of material in the collection bin is 6 tones. This is of course variable depending on the size of the collection bin.
9. When the collection bin is full of dried and composted green waste (the compost), the collection chamber door or doors are opened and the bin is dragged out from the length of apparatus and is hauled away. It is to be understood that a a conveyor system can be used to transfer the finished compost product to a central holding area using an automated conveyor system. Offtake trucks could then be loaded from the central holding area. A new collection bin is pushed under the apparatus, within the collection chamber to again collect dried and composted waste, enabling a continually operating process.
10. The collection bin is housed in a sealed collection chamber, in part, so rats and other pests cannot feed at the collection bin. When the collection bin is to be changed out, end doors are opened. When the collection bin is replaced, the end doors are closed.

It is to be understood that the size of the composting container may vary in accordance with commercial needs on sites. Although not bound by sizes, it is anticipated that 8, 12 and 20 cubic yard units will be most well received in the industry. Auger size will depend on container size. What is important about the auger is its placement within the container, preferably that it is disposed longitudinally within a top ¼ of the container, more preferably within a top ⅛ of the container, and preferably just below the organic material entry portal. What is also important is that sensors are aligned with the auger, preferably just above the auger, such that "fill levels" are monitored and controlled in a feedback loop between auger (triggering its rotation) and the rotating gate. Within the scope of the invention, the sensors, auger, and rotating gate all work together to ensure that the chamber is kept as full as possible while still allowing for (preferably) more organic waste to be added, at any given time. The auger ensures that waste does not pile up in one particular zone of the chamber, and the sensor plus auger plus rotating gate operate to ensure that enough compost product is removed from the bottom of the chamber to cyclically and continually open up room for new waste at the top.

As noted herein, placement of the auger, along with the sensors, enable a fill level feedback mechanism for to be system to be operated most optimally. For example, if the level of the organic waste inside the container reaches the auger (or more accurately the sensor(s) adjacent to the auger), then the chamber is known to be 90% full. The ideal positioning of the auger in the container is such that fill aligned with auger continues to represent a 90% full container As will be apparent to those skilled in the art, the various embodiments described above can be combined to provide further embodiments. Aspects of the present systems, methods and components can be modified, if necessary, to employ systems, methods, components and concepts to provide yet further embodiments of the invention. For example, the various devices and methods described above may omit some parts or acts, include other parts or acts, and/or execute acts in a different order than set out in the illustrated embodiments.

Further, in the methods taught herein, the various acts may be performed in a different order than that illustrated and described. Additionally, the methods can omit some acts, and/or employ additional acts.

These and other changes can be made to the present systems, methods and articles in light of the above description. In general, in the following claims, the terms used should not be construed to limit the invention to the specific embodiments disclosed in the specification and the claims, but should be construed to include all possible embodiments along with the full scope of equivalents to which such claims are entitled. Accordingly, the invention is not limited by the disclosure, but instead its scope is to be determined entirely by the following claims.

EXAMPLES

Example 1: Estimation of BioDryer Capacity

The working volume of a compost bin is about 66 m3 (2333 ft3) or about 37 tonnes of material when allowing for air space between particles. It is expected that drying decreases the volume of green waste by half. Biodegradation further reduces green waste volume by 50% of what remains as a consequence of drying. The following Table considers the feed rate, the expected production rate of compost, and the solids residence time (SRT, the average length of time of solids in the BioDryer).

| Number of Green Waste Totes/Day | Feed Rate of Green Waste Fed to BioDryer [Tonnes Green Waste/Day] | Estimated Compost Production Rate [Tonnes/Day of Composted Green Waste in Collection Bin] | SRT Based on Tonnes/Day of Dried and Composted Green Waste in Collection Bin [Days] |
|---|---|---|---|
| 3.3 | 1 | 0.25 | 56 |
| 6.7 | 2 | 0.50 | 28 |
| 9.9 | 3 | 0.75 | 21 |
| 13.2 | 4 | 1.0 | 14 |
| 16.5 | 5 | 1.25 | 11.2 |
| 19.8 | 6 | 1.50 | 9.3 |
| 23.1 | 7 | 1.75 | 8.0 |
| 26.4 | 8 | 2.0 | 7.0 |
| 29.7 | 9 | 2.25 | 6.2 |
| 33.0 | 10 | 2.50 | 5.6 |

Based on the Table above, for example 26 totes or 8 tonnes could be emptied into the BioDryer each day, taking about 1 hour in total for loading. The extent and rate of the estimated solids reduction clearly requires confirmation through testing.

Example 2: Summary of Preferred Equipment Specifications

Composter Bin

Standard painted 40' steel transport container (8'×40'×8.5' height), divided into an 8'×20' long composter and an 8'×20' mechanical housing (blowers, lift, controls, electrical), 1" PVC pipe air inlets spaced at 24" on 45° vee sides, manual ball valves on each inlet Working volume of compost bin is about 27 m3 (960 ft3) or about 14 tonnes of material with void space. With the empty container weight about 4 tonnes, the total operating weight is about 18 tonnes not including the equipment below.

Rotary Gate

20" diameter×20' length 4 flight steel rotary gate, mounted at base of 45° vee bottom, 5 hp single phase motor (outside mount)

Solids Collection Chamber with Support Frame and Sealable Collection Chamber

8'×40'×5' height steel "I" beam frame to support 40' transport container and accommodate removal of roll off solids collection bin. Transport container sits on support frame with gaps less than ½" (rat proof).

Sealable (versus rats, 3 sides and floor) solids collection chamber with end doors that houses a standard roll off 6'×20'×4' height solids collection bin.

Blowers

Two single phase blowers, each 5 hp

Lift and Ramp

Bins will be pushed up an 18" ramp and positioned where a hydraulic lift raises a maximum 300 kg green waste bin and slowly empty its contents into a feed hopper that chips green waste. A timer returns the bin back to the loading base.

http://www.wastequip.com/products/product-detail.cfm/categoororganics2go/subcategory/cartlifter/product/mobile-cartlifter Feed Hopper and Chipper A covered 200 litre feed hopper will be fed by the hydraulic lift. A chipper comprising 4 cutting blades mounted on a rotating 18" diameter disk, driven by a 5 hp single phase motor, cut green waste to a 1" particle size.

Auger

16" diameter×20' length steel auger, mounted near top of composter bin, 3 hp single phase motor (outside mount).

The invention claimed is:

1. A self-contained apparatus for converting organic waste into compost which comprises:
a) an enclosed composting chamber comprising a top, a bottom, a first end, a second end and two opposing sides, wherein the composting chamber comprises, adjacent to a corner between the top and one side, an organic matter entry portal and also comprises, at the bottom of the composting chamber, a compost exit portal;
b) an auger extending at a level along a length of the composting chamber and adjacent to the top of the composting chamber, wherein the auger is horizontally disposed to draw organic matter along a length of the composting chamber and to prevent clogging of the organic matter at the organic matter entry portal;
c) a sealable collection chamber disposed under at least a part of the composting chamber, aligning with the compost exit portal, said collection chamber comprising at, at least one end thereof, a door for access therein;
d) a collection bin of a size and dimension to fit entirely within the collection chamber and removable therefrom when full of compost;
e) an air supply means for introducing controlled air into the composting chamber to aid in the decomposition of the organic material;
f) sensors to detect the level of organic material in the composting chamber relative to the level of the auger;
g) a rotating gate between the compost exit portal and the collection chamber providing intermittent closing of the composting chamber and opening of the composting chamber for transference of compost from the composting chamber to the collection bin there below; and
h) a means to deliver at least one switching signal from the sensor.

2. The apparatus of claim 1 wherein the composting chamber is substantially rectangular.

3. The apparatus of claim 1 wherein the composting chamber comprises a V-shaped bottom.

4. The apparatus of claim 1 wherein the collection chamber comprises additional service doors.

5. The apparatus of claim 1 wherein the rotating gate is activated by the sensor.

6. The apparatus of claim 1 wherein the rotating gate opens and closes in 90 degree increments.

7. The apparatus of claim 1 wherein the rotating gate comprises a gate sensor for tallying the number of open-shut gate rotations.

8. The apparatus of claim 1 wherein the rotating gate comprises a gate sensor for tallying the number of open-shut gate rotations and there is a means to feedback the tally to a controller, said controller controlling organic matter feed intake at the organic matter entry port.

9. The apparatus of claim 1 wherein the air supply means comprises two air inlets disposed to inject air to the bottom of the composting chamber.

10. The apparatus of claim 1 wherein the sensor is a light sensor across a width of the composting chamber, adjacent to the top, and wherein the light sensor is enabled to feedback data to a controller, therein to ensure that the composting chamber is always at least 90% full of organic matter.

11. The apparatus of claim 1 wherein the sensor is an opposed-mode sensor wherein an emitter and a receiver are opposite each other, on opposite ends of the composting container and adjacent to each end of the auger, and wherein the opposed-mode sensor is enabled to feedback data to a controller, therein to ensure that the composting chamber is always at least 90% full of organic matter.

12. A process of composting organic matter using the apparatus of claim 1.

13. The process of composting of claim 12, wherein any one or both of: the step of turning the auger for a selected time, and the step of opening a rotating exit gate for a selected time period, is pre-programmed.

14. A process of composting which comprises:
 a) introducing shredded raw organic matter into an enclosed composting chamber through an entry portal, wherein said chamber comprises an auger adjacent to the entry portal and wherein auger is operatively aligned with at least one sensor to measure the fill of the chamber, relative to a level of the auger, and wherein the auger is horizontally disposed to draw organic matter along a length of the composting chamber and to prevent clogging of the organic matter at the entry portal;
 b) measuring the fill of the chamber relative to the level of the auger and in response,
  i) stopping the inflow of shredded organic matter at the entry portal;
  ii) turning the auger for a selected time;
  iii) opening a rotating exit gate for a selected time period, for removal of composted content at a bottom of the chamber.

* * * * *